United States Patent [19]

Kwang et al.

[11] Patent Number: 5,862,327
[45] Date of Patent: Jan. 19, 1999

[54] ACTIVITY BASED LONG-LIVED TRANSACTION SYSTEM

[75] Inventors: Eng Kee Kwang, Beaverton; Suresh Kumar, Lake Oswego, both of Oreg.

[73] Assignee: Tactica Corporation, Portland, Oreg.

[21] Appl. No.: 661,198

[22] Filed: Jun. 10, 1996

[51] Int. Cl.$^6$ .................................................. G06F 17/30
[52] U.S. Cl. ........................ 395/200.33; 395/200.57; 395/671; 395/200.32; 707/10
[58] Field of Search ................ 395/200.33, 200.57, 395/200.32, 200.31, 200.47, 200.48, 200.49, 671, 676; 707/10, 3

[56] References Cited

U.S. PATENT DOCUMENTS

| 5,491,820 | 2/1996 | Belove et al. ...................... 395/200.33 |
| 5,524,241 | 6/1996 | Ghoneimy et al. ...................... 707/10 |
| 5,596,750 | 1/1997 | Li et al. .................................. 395/671 |
| 5,623,656 | 4/1997 | Lyons ........................................ 707/10 |
| 5,630,069 | 5/1997 | Flores et al. .................................. 705/7 |
| 5,706,500 | 1/1998 | Dzikewich et al. ............... 395/182.13 |

OTHER PUBLICATIONS

C. Mohan: "Aires/CSA: A Method for Database Recovery in Client–Server Architectures" Sigmod Record., vol. 23, No. 2, Jun. 1994, New York US, pp. 55–66, XP000454449.

R.A. Crus: "Data Recovery in IBM Database 2" IBM Systems Journal, vol. 23, No. 2, 1984, pp. 178–188, XP002045073.

*Primary Examiner*—Dung C. Dinh
*Attorney, Agent, or Firm*—Titus & McConomy LLP

[57] ABSTRACT

An activity based system for long-lived transactions between disconnected servers and clients. The invention utilizes activities for processing information between occasionally connected servers and clients by executing code or both. The activity is a distributed object which executes the system script, extracts data from a database, and assigns tasks to be prepared by the client. The activity includes program code which provides failure recovery, restart from a termination and ACID interaction with a database.

14 Claims, 9 Drawing Sheets

ACTIVITY BASED LONG-LIVED TRANSACTION SYSTEM

FIELD OF THE INVENTION

The present invention provides a system that extends transaction oriented information over a wide area connectivity infrastructures for remote or disconnected users, and in particular provides a distributed computer network for client-server applications.

BACKGROUND OF THE INVENTION

In today's business climate it is critical to integrate business processes over the entire business enterprise. This is relatively easy in the situation where all information is accessible to those in the enterprise working on a local areal network (LAN). However, where information is distributed over many remote locations, the ability to support disconnected users of the enterprise information becomes more difficult. Thus, in distributed systems such as office automation, CAD, manufacturing control and the like, the units of work are very long and complex compared to classical transactions.

Classical transactions are limited to defined as atomic, consistent, isolated and durable ["ACID"]. To achieve such transactions in the context of an enterprises database systems, the work must comprise only a few data items that have a short residence time. In such systems The commitment to changing the enterprise database is delayed so that the data involved in the transaction is locked for the duration of the transaction. The implementation of such measures in a long-lived business environment is unacceptable because the duration of the transaction must be short since extending the locking of the data would seriously impact the efficiency of the database. In business critical applications such locking would be extremely detrimental.

The ACID transaction properties are advantageously used in inventory control, banking and reservation systems. The fundamental drawback of the traditional transaction system is the assumption that the transaction is concurrent and completely unrelated to the units of work. Consequently, any existing interrelations between individual transactions cannot be implemented by the system, but have to be handled by the application. In long-lived transaction, it is typical to have an internal structure that has to be maintained by the system. The requirement of atomicity in the traditional system requires that such requirement not be modeled as a transaction, but typical database systems do not have any other means for handling that.

ACID transactions control concurrency by isolating atomic transitions against each other to create a serializable schedule by delaying updates until the commit of transaction. This resolution is not acceptable to long lived transactions because of performance degradation caused by holding long locks that have the effect of blocking other activities and the creation of transaction abortions due to deadlock and conflicts.

Various models have been proposed to deal with implementation of the long lived transaction, especially in the business context. One interesting model is the ConTract Model proposed by Andreas Reuter, ConTacts: A means for Extending Control Beyond Transaction Boundaries. *Proc. 3rd Int. Workshop on High Performance Transaction Systems*, Asilomar, September 1989. See also, Andreas Reuter and Helmut Wachter[]. While the models proposed address the problems associated with prior art transactional systems, they fail to provide a method for implementing the model for use in business critical applications.

Accordingly, it is an object of the present invention to provide a system for long lived transactions that reflect business process and business event activities. It is a further object of the invention to provide a method for implementing long-lived transactions which encapsulate business process rules and which provides the transaction with embedded historical data. It is an object of the invention to provide business process rules in a transactional primitive which can encapsulate specific data for off-line operations. It is a object of the invention to provide a system that permits forward recovery to undo changes made to a database and which provides for undoing multiple transactions or compensating transactions. It is also an object of the invention to provide crash recovery and conflict detection as well as to provide a framework in which to resolve such conflicts. Finally, it is an object of the invention to provide a system that facilitates the distribution of computing across a distributed and disconnected Wide Area Network ("WAN").

SUMMARY OF THE INVENTION

Generally, the present overcomes the limitations of prior art transactional systems and provides an activity based transaction platform which uses agent technology for activities and communication. The present invention is a distributed object-based client/server platform using fourth+ generation scriptable objects. The system is independent of the communication technology and the database, host or client. The invention permits the development of client-server applications. As used herein, a client/server program is a program that sends a request to a program at another location and awaits a response. The present invention provides a method that automatically provides delivery and integrity of the communications between clients and servers using existing communication methods. It also provides the extraction, insertion and replication of required subsets of data from an enterprise database.

Accordingly, the present invention is a collection of automated programs that run on a server and a set of automated tasks that run on remote or mobile client computers. The users of the system can connect to a server, download their available activities, disconnect from the server and work on the activities by processing the information. When completed the user can connect with the server and upload the processed information.

The present invention thus provides a configureable framework for the occasionally connected servers and clients. The basic framework is an activity which is a transactional object that embodies business rules and data. An activity is an agent that completes its tasks by executing business rules on the server and client. The activity is also a distributed object that executes part of its code on the server and part on the client. In wide area networks the client and server are only connected occasionally by a communications media such cc:Mail, MAPI, wireless, TCP/IP. Thus the present invention implements queuing on both the server and client to store work requests until a connection is established. Caching is used to store the data when no connection is established.

The activity is used to transmit the data between client and server when the connection is established. In order to define the activity object it is necessary to establish which data is needed, for whom the data is needed and what needs to be done with the data. Thus a business process consists of a set of activities which is completed by completing all the activities that make up a process. The activity starts in response to an external event, a trigger, such as a value of a database field or at a scheduled time. Activities can select data from a database, perform calculations on data, display data and the like. Activities are made up of tasks and the tasks are comprised of task items that are lists of actions to be performed on the associated information in the enterprise database.

The user of the present invention may begin a process at a client by receiving a list of activities, tasks and task items. Each activity is available to the user by showing up on the user's list of available activities. When a user views a task item, that view may display information or require information to be furnished or may have messages about information being processed. When a user completes all the task items in an activity, the activity is moved to the list of completed activities. When all of the activities are finished, the user can send the processed data back to the enterprise database at a server.

In the present invention, the activity preferably includes a number of step blocks, normally six. In the preferred embodiment theses include: prolog, extraction, assignment, client tasks, update and epilog block. Typically, the Prolog step is the first step in the activity and it executes any generic script used by the system. Extraction is an explicitly defined set of rules for data subsets that are extracted for modification or manipulation on the client. The Assignment block explicitly defines the rules for evaluating the client/recipient of the activity object. The Client Task step, on the other hand, explicitly defines the task that are to be executed on the client. The client task normally comprises a prologue, task item and epilog. Update explicitly defines the business rules for which data on the server that needs to be updated or modified. Epilog is the last step in the activity that executes generic script used by the system. Subsequent activity triggers are typically placed in the epilog block.

Each of these steps is executed as a process. With the completion of each process, the activity is put in a transactional queue and each step is scheduled as a process using a priority scheme. The activity can be terminated in any of the stages. With respect to the execution of the steps, only the client tasks is executed on the client and all other steps are activated on the server.

In the present invention, each activity object can manipulate business data objects. When activity objects are chained into a business process, data is usually not passed between the activities through any shared memory or message queues. This data is typically global data that is maintained in relational or legacy databases. The activity object is also provided with the capability of defining input and output parameters. The parameter data can be passed between activities and is used interface with other applications in the enterprise. The parameters can also be passed to or from the enterprise application through the input and output mechanism.

In the transactional system of the present invention the activity is preferably defined as one logical unit of work in a business process. Each of the six steps, or less as the case may be, in the activity is similar to a node in a nested transaction. Each of the sub-transactions can commit or rollback. Once a step in an activity has completed, the state of the database permanently changes. The steps of the activity in the present invention are characterized by:

i. their ability to completely restart. Each activity step can be terminated without terminating the activity so that the step can be restarted.

ii. the ability to re-run an activity step in the case of a failure.

iii. if any step in activity fails to execute, the activity is placed in an error queue where it can be retried manually at a later time.

iv. ability to undo all changes in any of the steps.

v. the client can request the re-execution of the client task step, so that the server resends the activity to the client.

vi. the ability to detect conflicts when changes to the activity comes back from the client.

The system of the present invention utilizes triggers to control the sequence of events in an application as well as external events. Activities can also trigger one another. Triggers can be time base, application directed or a change to the data.

By implementing a set of inter-related activities, it is possible to model very complex control flows that operate on large groups of related data that can be distributed across a number of systems. Long-lived transactions involving multiple activities can be sequenced by using timers and triggers and by interfacing with existing workflow systems. Other advantages of the present invention will become apparent from a perusal of the following detailed description of a presently preferred embodiment of the invention taken in connection with the accompanying drawings.

PRESENTLY PREFERRED EMBODIMENT

Figure 1:
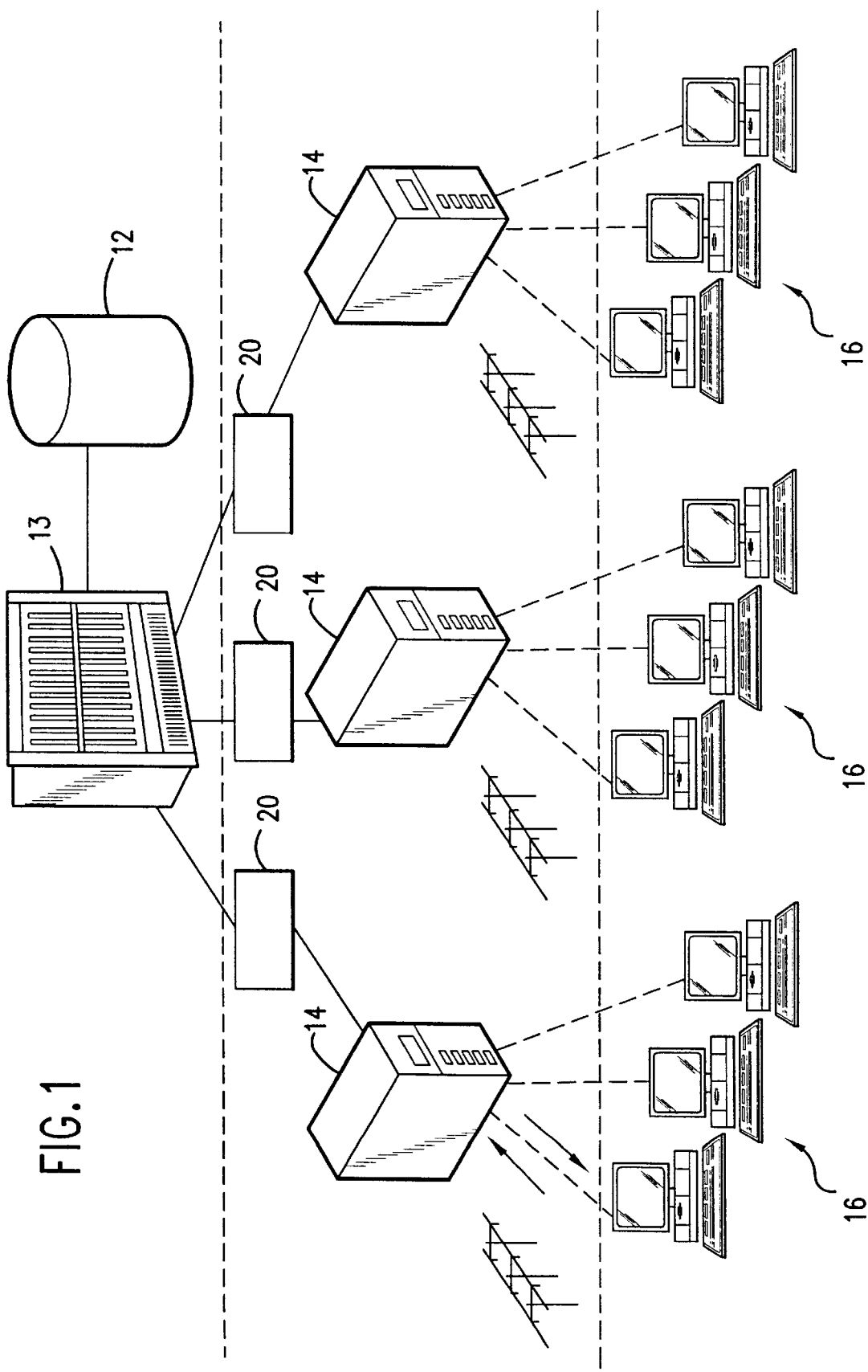
FIG. 1 is a diagrammatic view of the relationship of the system in a client server environment.

Referring to the drawings, a presently preferred embodiment of the runtime component of the present invention is diagrammatically portrayed. A brief description of the build-time component of the present invention will be described in connection with the activities.

With reference to FIG. 1 an enterprise database 12 such as MVS DB2, CA/INGRESS, Oracle, SQLServer relational databases is in communication with an enterprise server 13. Server 13 may be connected to a number of application servers 14. Application servers 14 process transactions by and between various remote users or client computers 16. Client computers 16 can be connected to application servers through a number of communication media and software. For example via the internet—TCP/IP—, cc:mail, wireless and the like to create a wide area network.

The system of the present invention resides on both the remote client 16 and enterprise server, preferably a dedicated server 20. Server 20 is responsible for extracting a subset of the date from the enterprise database 12 as described hereinafter and queuing that data subset with instructions on what to do with it. Preferably, the various management components of the present invention reside in server 20.

Figure 2:
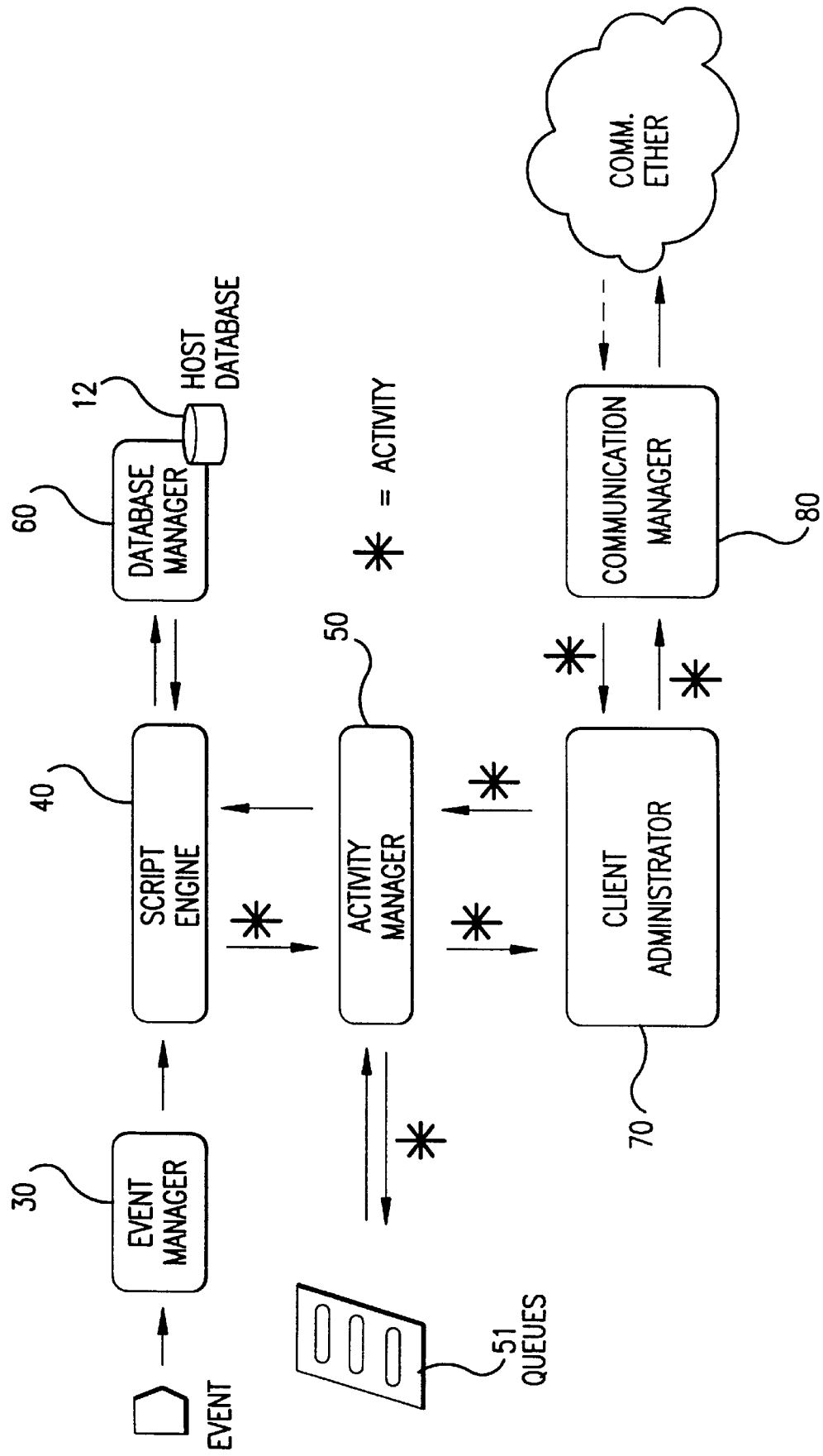
FIG. 2 is a block diagram of system components on a server.

Referring to FIG. 2, the system of the present invention is stored on a dedicated server 20. As shown in FIG. 1, server 20 is connected to remote access server enterprise database server 12 and a workflow server 14. Included within the system is an event manager 30. Event manager 30 handles the external stimuli or triggers to the system. Input to the event manager is through interfaces with a number of the external server outputs. The external triggers may include time, file system data and database information. The event manager 30 is used to monitor stimuli and to manage the business rules and business events used by the system.

The external triggers are mapped to system events and the events are handled by the event manager 30 by means of Script Engine 40. Script engine 40 provides a library of domain objects and defines all objects used in the system. In the presently preferred embodiment, the programming language of the system is known as Script and is used for scripting, conditioning, subsetting and the like. The language syntax follows that of C/C++ and applies the concept of objects to the basic elements of the invention. The language includes a macro function, database table, record and field references, forms and field, process and activities, input, output and local variables, simple arithmetic expressions, conditional assignments and expressions. Since script is an interpreted language, script engine 40 performs inline tokenization, lookup and evaluation. A script statement is tokenized from left to right with '( )' constructs causing a recurion or nested evaluation.

In the preferred embodiment, the script includes a number of built-in objects. Each of these has a set of messages (functions) that it responds to. These objects, their global instances, the messages they provide, and any data they contain, can all be viewed via a Script browser/editor.

TABLE I

| Category | Objects |
| --- | --- |
| Basic Functionality | _System, _Primitive, _File |
| Database | _DataSource, _Table, _User, _View |
| UI | _FormField, _FormWidget, _TabForm |
| Application | _Activity, _Instance, _Client Manager, |
| Architecture | _Dde |
| Communication | _Agent, _SubsetAgent |

For example, _Activity is a class used to deal with activity templates. An _Activity might describe something about activity templates in general. It is also the entity used to generate a particular template. An actual activity template is produced by asking _Activity to generate one. This is done by sending it a message. Once the template is generated, it can ask the template to do things, such as launch an activity.

A message in the present invention is an instruction/request to a receiving entity. Messages understood by a class are called its 'class messages'. Messages understood by and instance are called 'instance messages', or simply, 'messages'. An instance is an example or instantation of a class.

A class or instance only responds to messages it knows about. A message is an instruction/request to a class or instance to do something. In this example, creating an activity template is accomplished by a class message to _Activity. Launching an activity is accomplished by an (instance) message to an _Activity instance.

Thus, for example, _Activity is the class for activity templates. Activity templates are pseudo classes for activity instances. Hence, to create an activity instance, there must first be an instance of an activity template. An activity template instance is generated by calling _Activity.Select (<server name>).

Activity templates are generally well-known by name. Thus an activity template instance can often be obtained by simply referring to it by name.

Script is used much like macros to execute commands to accomplish an action. Example of Script is set forth in Table II. The user of the system writes script that is automatically added to an object. Script can be added to activity prologs, task, task completion logic and the like Thus the user can write scripts that perform actions before, during and at the end of an activity or task. In the build time component of the invention, the user can build process models complete with process scheduling rules, conceptual or logical participants and all data structures to be used in the process. The result of the buildtime component is logical and not addressed to any physical reality. During the configuration stage of development the user configures the process model to a unique reality of the business and to the exact enterprise database 12 from which the data is extracted.

TABLE II

Comments
- Two slashes (//) causes the rest of the line to be ignored.
- between a slash and star (/*) and a star and slash (*/) is ignored.

Examples:
a = b; // is an assignment
b == c; /* is a comparison */
Output
Script provides several ways to output.
- Transcript
  Prints out to the     Transcript window (which is present
  whenever any     application is running).
  Transcript ("Today is a good day");
  // Writes to the     Transcript window
- Message
  Puts up a message box on the screen.
  // Puts up a message
  Message("Today's News", "Mark up 24.23");
- Database
  // Customer is a table
  records = Customer.name ("Wilson");
  // Sets description field.
  record[0].description = "Confectioner";
Input
Script has two ways of reading input.
- From a user
  age = Prompt ("Prompt", "Enter your age");
- From a database table
  // Customer is a table
  record = Customer.name ("Wilson")
  desc = record.description ( );
Variables
- Variable names must be unique throughout the application.
- Variable names can begin with a character or an underscore (_).
  age = 14;          // OK
  2age = 14;         // Error
  _age = 14;         // OK, but not recommended
- Variable names can consist of alphanumeric characters and underscores
  age2 = 14;         // OK
  age_group = 14;
- Variables don't have to be declared before they are used. They take on the type of the value they are assigned.
  age = 14;         // Age is a number
  age = "fourteen";    // Age is a string
Keywords
- each
- this
Reserved Words
The following words are reserved.

| catch | critical | else |
| --- | --- | --- |
| extractDo | for | if |
| return | session | throw |

TABLE II-continued

```
transaction           try             while
Types
Script offers the following basic types.
• boolean
    signal = TRUE;
    check = FALSE;
• integer
    a = 10;
    b = -23;
• float
    temp = -23.45;
    g = 981.04;
• character string
    name = "Cal Ripken, Jr.";
• array
    array = {1, 2, 3, 5};
    array2 = {"five", "six", "seven", "eight"};
    array3 = (1, 3, "six", "eight"};
    Script supplies additional object types specific to developing
    applications.
Operators
Assignment
• Assignment (=)
    x = 10;
    y = x; // y is 10
• Assignment-increment (+=)
    x = 10;
    x += 2; // x is 12
• Assignment-decrement (-=)
    x = 10;
    x -= 2; // x is 8
• Assignment-multiplication(+=)
    x = 10;
    x *= 2; // x is 20
• Assignment-division (-=)
    x = 10;
    x /= 2; // x is 5
Arithmetic
• Addition (+)
    x = 10;
    y = 20;
    z = x + y; // z is 30
• Subtraction (-)
    x = 10;
    y = 20;
    z = x - y; // z is -10
• Multiplication (*)
    x = 10;
    y = 20;
    z = x * y; // z is 200
• Division(/)
    x = 10;
    y = 20;
    z = x / y; // z is 0
    y = 20.0
    z = x / y; // z is 0.5
• Modulus(/)
    x = 103;
    y = 3;
    z = x % y; // z is 9
    y = 20.0
    z = x / y; // z is 0.5
• Auto-increment—postfix (++)
    a = 5;
    b = a++; // b is 5, a is 6
• Auto-increment—prefix (++)
    a = 5;
    b = ++a; // b is 6, a is 6
• Auto-decrement—postfix (--)
    a = 5;
    b = a--; // b is 5, a is 4
• Auto-decrement—prefix (--)
    a = 5;
    b = --a; // b is 4, a is 4
String
• Concatenation (+)
    str1 = "abc";
    str2 = "efg";
    str3 = str1 + str2; // str3 is "abcdef"
Boolean
• Logical AND (&&)
    a = 5;
    b = 7;
    flag = a > b; // flag is FALSE
    flag = b > a; // flag is TRUE
• Logical OR (||)
    a = 5;
    b = 7;
    flag = ( (a > 5) || (b > 5) ); // flag is TRUE
    flag = ( (a < 5) || (b > 7) ); // flag is FALSE
• Logical NOT (!)
    a = 5;
    b = 7;
    flag = !(a > 5) // flag is TRUE
Array access
• Indexing ([ ])
    intArray = {1, 4, 6, 2};
    x = intArray[0]; // x is 1
    y = intArray[3 ; // y is 2
    z = intArray[4]; // error-index out of bounds
Comparison
• Equality (==)
    a = 5;
    b = 7;
    flag = (a == 5); // flag is TRUE
    flag = (a == b); // flag is FALSE
• Inequality (!=)
    a = 5;
    b = 7;
    flag = (a != 5); // flag is FALSE
    flag = (a != b); // flag is TRUE
• Greater than (>)
    a = 5;
    b = 7;
    flag = (a > 5); // flag is FALSE
    flag = (b > a); // flag is TRUE
• Less than (<)
    a = 5;
    b = 7;
    flag = (a < 5); // flag is FALSE
    flag = (a < b); // flag is TRUE
Statements
Control Flow
• If-else construct
    sum = 0;
    // do something
    if (sum = = 0) {
    }
    // sum is 0, do one thing . . .
    else {
    //sum is nonzero, do something else
    }
• try-throw-catch construct
    sum = 0;
    // do something
    try {
        name = Prompt("Name", "Enter your name");
        if (name != "Rocky")
            throw ("punch");
    }
    catch ("punch") {
        // do something
    }
Looping
• for loop
    while loop
    sum = 0;
    while (sum < 10) {
        // do something
        sum++;
    }
Block Statements
• session
    A session block tells Script to connect only once to a data
    source whenever that data source is accessed. The connection is
    maintained until the end of the session block. The session is an
    optimization construct. If a statement that requires database
    access is put outside of a session block, then the
```

TABLE II-continued application will connect to the data source, do what is required of it, and disconnect. Repeated connects and disconnects impair performance, hence the use for the session block.
There may be situations when the session block should not be used—for long-lived data usage, it would be unwise to keep the database connected over the entire period.
session {
    // database access, connect to data source 1
    // do something with data source 1 . . .
    // do something else with data source . . .
    // connection still exists
    // . . .
    // disconnect from data source
}
- transaction
A transaction statement provides a way to perform atomic operations against the database. For example, if we were to extract some data from the database, change it and put it back, we want to be sure that the same data has not been altered in the meantime via another access. Putting the extraction and the modification within a transaction block assures us that the data has not been modified in the interim.
transaction {
    // extract data from database
    // do something to it . . .
    // update database
}
There can be transactions within transactions (nested transactions).
- critical
A critical block is to other code what transaction is to database access. The critical block is similar to a semaphore for a critical section in programming—only one process can be executing that piece of code at any given time. This allows a degree of serialization of activity programming. Note that critical and transaction blocks can be interleaved—there could be a critical block within transaction block, and vice-versa.
critical {
    // do something
}

In the preferred embodiment of the invention, activities use only a small part of enterprise database 12 and thus it is necessary to manage only those relevant portions; that is, those used by an activity. In the present invention this is done by data subsetting which defines an activity specific domain for data manipulation. The two levels of subsetting necessary for defining an activity are schema subsetting and record subsetting. Schema subsetting defines the view of the field that can map to fields in different tables from multiple enterprise database sources. Record subsetting selects the view that is created by the schema definition and association process. These records are extracted when the activity is executed at runtime.

Schema subsetting is done in two steps. The first is definitional and the second is schema association. Schema definition is similar to table creation in a relational database except there is no need to have a database present at definition time. This table is a logical representation of the data that may be manipulated in an activity. This permits the user to create a table with as many fields as the user wants. These field can have a number of attributes which are either data dependent attributes or display dependent attributes which are used in the visual presentation of a field.

With the schema definition, the user defines a set of fields relevant to an activity. Then, these fields are associated with the fields in actual enterprise databases 12. This process requires associating the data sources one at a time to catalog, select and display the relevant enterprise tables. An association is made between the relevant fields in the enterprise databases with the schema defined tables. This process is repeated until all of the fields in the activity are associated.

Figure 3A:
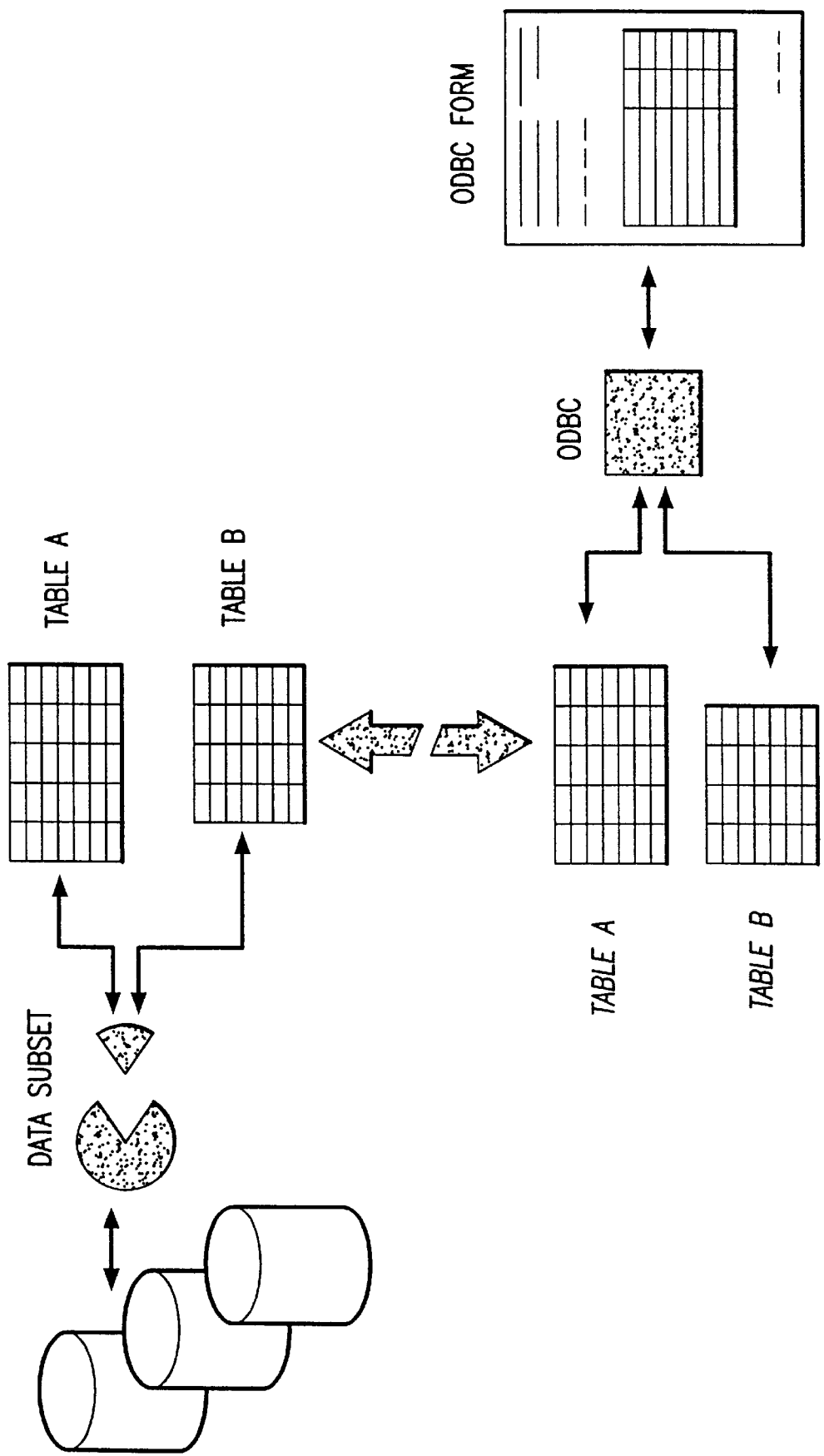
FIG. 3a is an illustrative schematic of database subsetting.
Figure 3B:
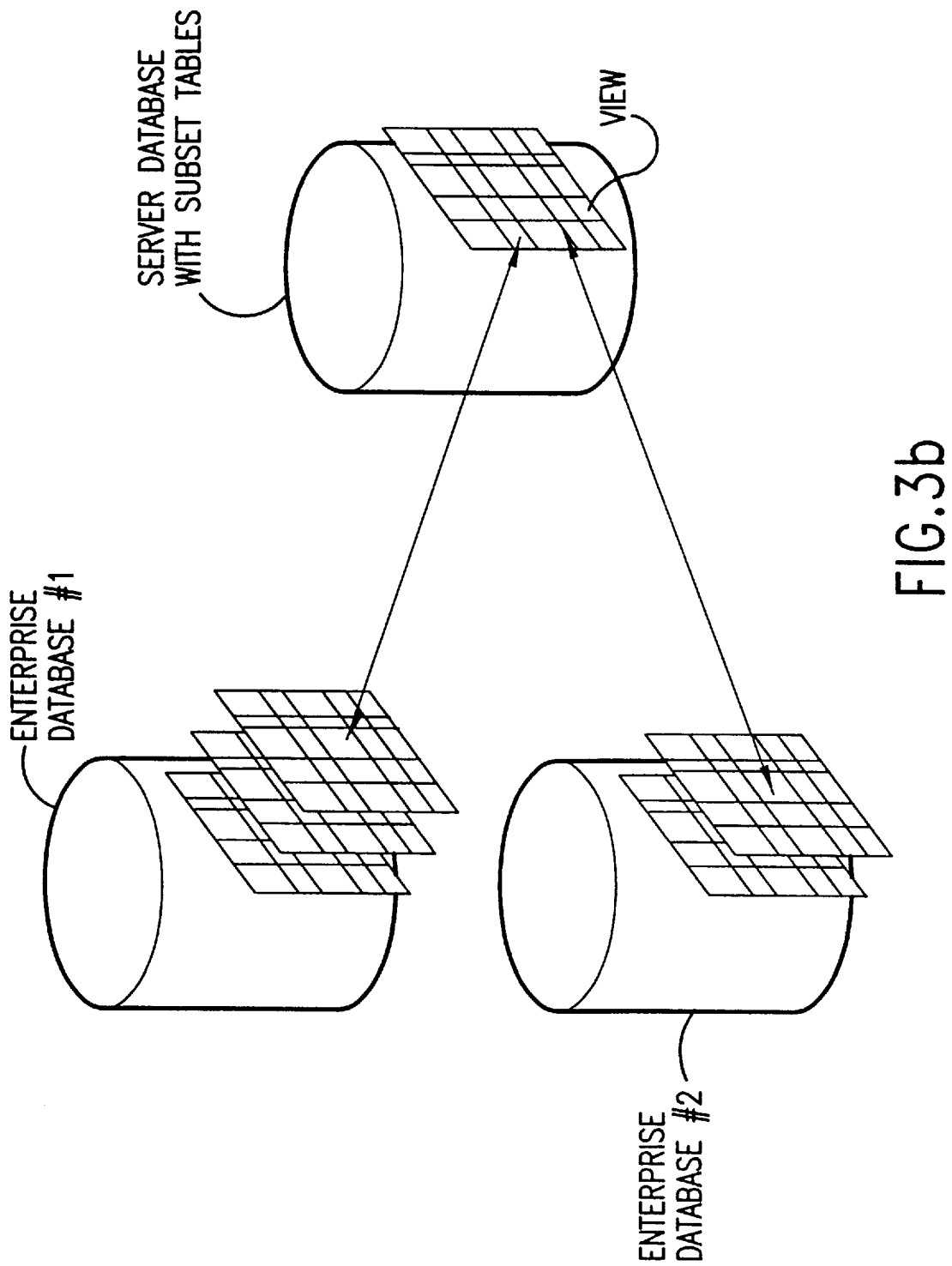
FIG. 3b is an illustration of the relationship between the enterprise database and server subset.

An illustrative diagram of this process is visually depicted in FIGS. 3a and 3b.

Events normally trigger the evaluation or continuation of scripted logic. The purpose and scope of the evaluated script is bounded only by the types of servers used. Most typically, the evaluation of the external trigger involves the instantiation of an activity which is passed to the activity manager 50 to manage. The Script engine manages the storage, retrieval and categorization of activity components. Activities can be created as a part of a process model or as part of a process archive.

The system script uses an agent class _Agent to execute scripts on a remote machine 16. It allows a client or server to send scripts to each other. The agents provide a mechanism to send arbitrary script commands to execute on a targeted client 16.

Consequently, the invention provides a framework to build applications that fit into the process model. From the business process, all processes are broken down into a collection of activities. The form of the activity provides a precondition or trigger and an action. The activities can be independent of each other and, of equal importance, can be run independently of each other. Thus, multiple projects or processes can be operating simultaneously in the system. The activities can be executed across multiple servers and client to balance the load on the system and provide scaleability to the system.

Figure 4:
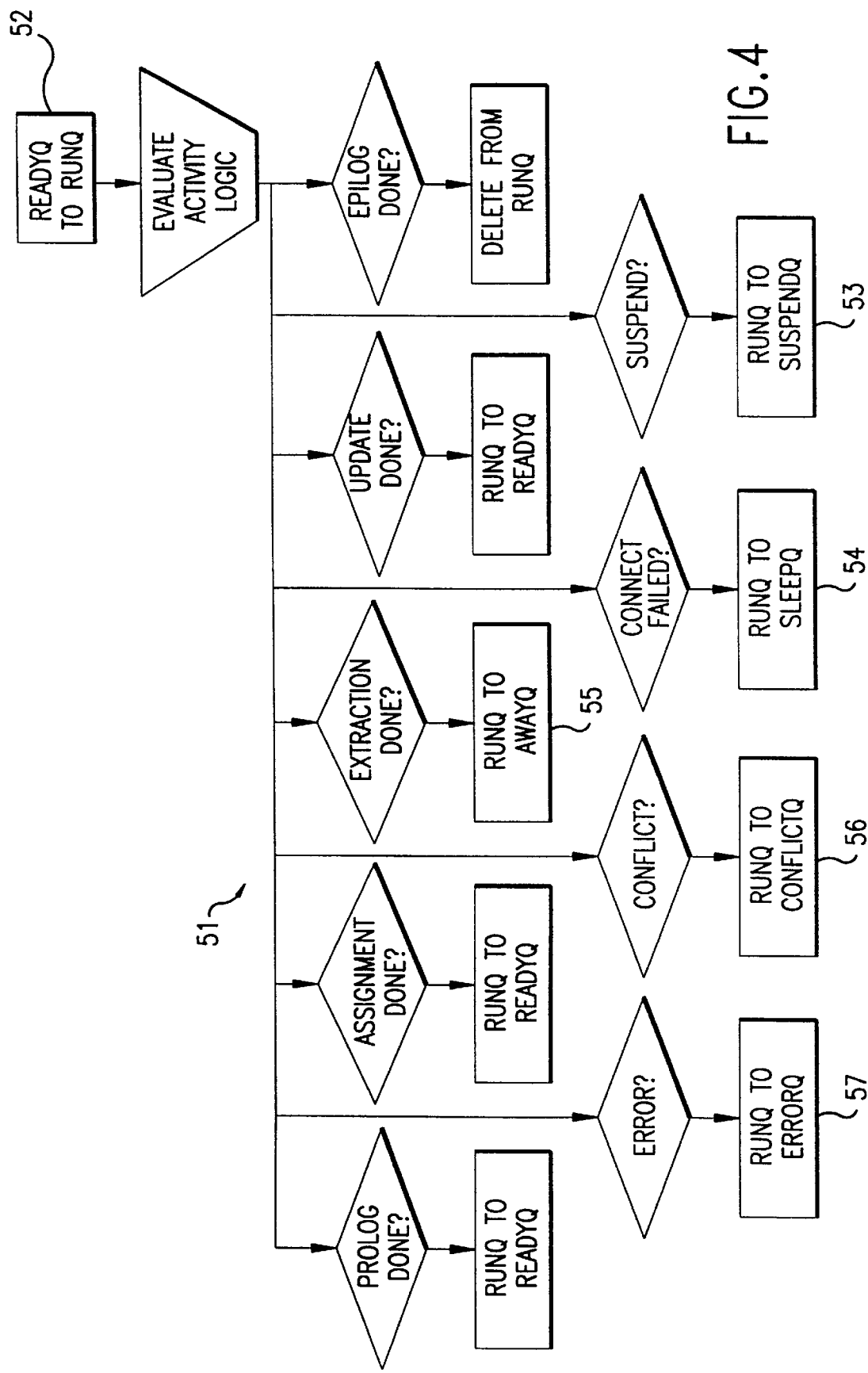
FIG. 4 is a flow diagram of the activity manager.
Figure 5:
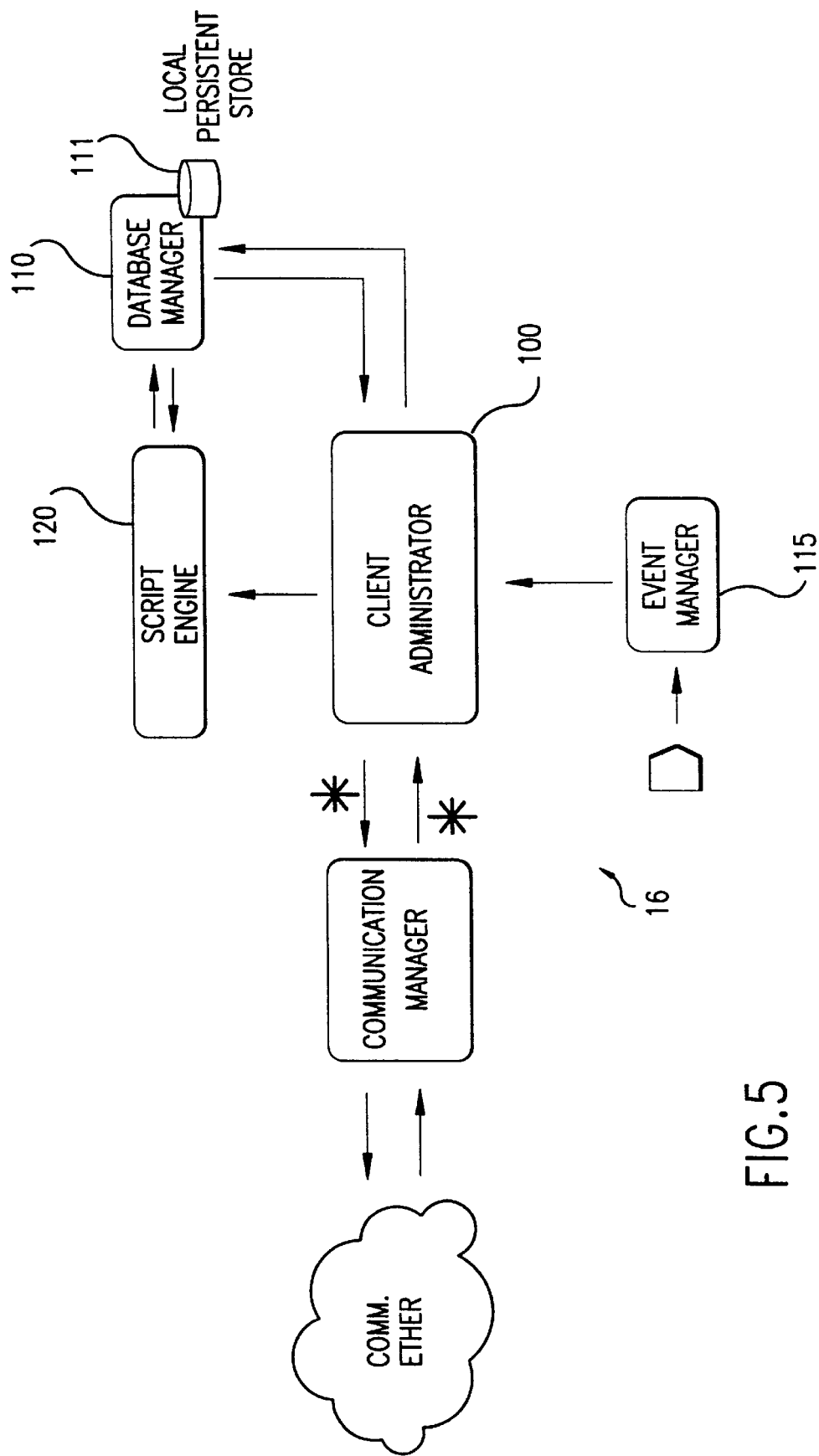
FIG. 5 is a block diagram of the system components on a client.

Referring to FIG. 4, the activity instances are managed preferably using a set of activity queues. Activity instances are placed in the ReadyQueue 52, RunQueue, SleepQueue 54, SuspendQueue 53, AwayQueue 55, ConflictQueue 56 or Error Queue 57 according to their state. Using a variety of load management, such as monitoring the number of concurrently running activities per processor or machine or the number of connections to databases or the like. Activity manager 50 selects activity instances from one of the queues 51, normally the ReadyQueue for execution. The execution of the activity instance involves the evaluation of the appropriate step in the activity logic according to its state. The evaluation is performed by Script Engine 40.

During the evaluation of the activity logic, script engine 40 provides the interface to the database manager 60 which permits the activity instance to access enterprise database 12.

When an activity instance has determined (by evaluation of the script and identity of the client) its assignment and completed data subset extraction from the database 12, activity manager 50 passes the activity to the client administrator 70. If an activity handed over to the client administrator is to return to the server, the activity is placed on the AwayQueue of the activity manager. Client administrator maintains a log of activity instances being sent to clients 16. In addition, client administrator 7 maintains a log of activity and data definitions sent to each client 16. The log optimizes of the communications by the client administrator by stripping off unnecessary code. By optimizing the activity at this level the user of the system can design activities without the need to optimize during the design phase.

The Client administrator 70 collects all associated data including attached files and passes them to the communication manager 80 for delivery to clients 16. Communication manager 80 wraps the activity instance and data into a form appropriate to the communication mechanism used by the enterprise or its clients. The activity as packaged is then placed in its appropriate mailbox to await a call from the client 16. When the client calls, the packaged activity is down loaded to the client for processing. At some point in time thereafter, the client returns the activity to the Communication manager 80. The activity is "unpacked" and delivered to the client administrator. The client administrator updates its memory log if necessary to acknowledge receipt of the returned activity instance. The activity instance is then passed back to the activity manager where it is removed from the AwayQueue 55 and placed in the Ready Queue 52 for further processing.

Figure 6:
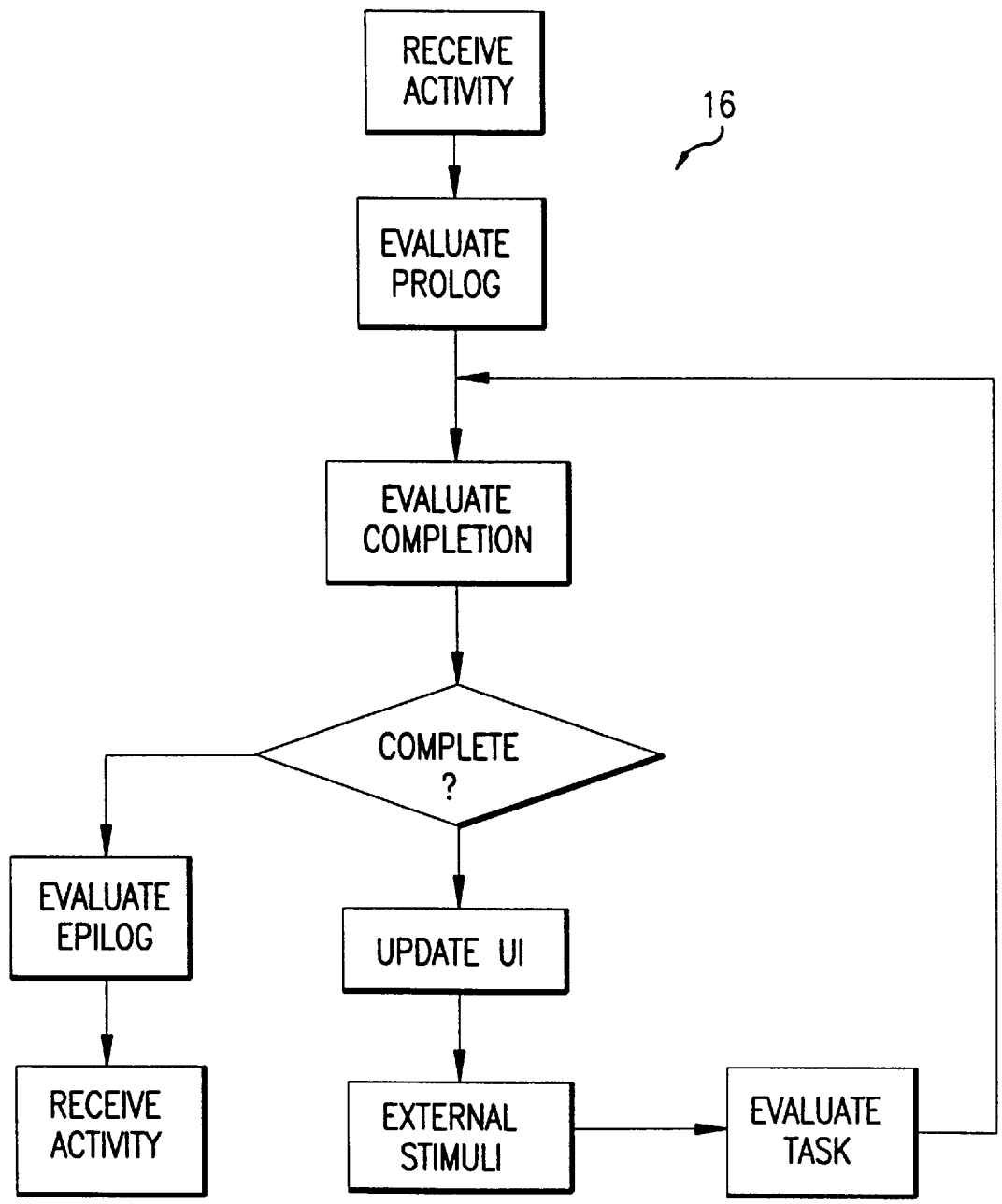
FIG. 6 is a flow diagram of the client manager.

Referring to FIG. 6, a diagrammatic view of the client is depicted. In this case client 16 receives an activity from communication manager 80 of server 20. The activity is received by communication manager 90 of client 16 where it is unpacked. The unpacked activity is passed to the client manager 100 where the prolog script is evaluated and the completion logic checked. The activity is place in either the Open Activity or completed activity queue. The activity and associated data is passed to the database manager 110 to managed in a local database 111 of client 16. Preferable the local database is ODBC compliant. Once the data is committed to the local database it is available for use by client applications external to the system.

Once committed to the local database, the activity instance is ready to be manipulated by various external stimuli, such as user input through a keyboard or mouse. The event manager 115 of the client is also available to handle non-direct stimuli such as time and triggers from external applications. The event is processed by client manager 100 which results in direct manipulation and changes to the data or indirect changes through visual form presentation of the activity instance. Any manipulation of the activity and its data in client manager utilizes script engine 120. As with the server, the script engine 120 on client 16 provides a scripting interface to the database manager to manipulate data.

When the client manager (FIG. 6) determines that particular activity instance is complete, such as using a check value, the activity is checked into the communication manager for return to the originating server. The activity instance is passivated, any required data extracted from the local database and placed in the appropriate mailbox. The packed passivated activity instance is returned the next time that the client connects to the appropriate server.

Figure 7:
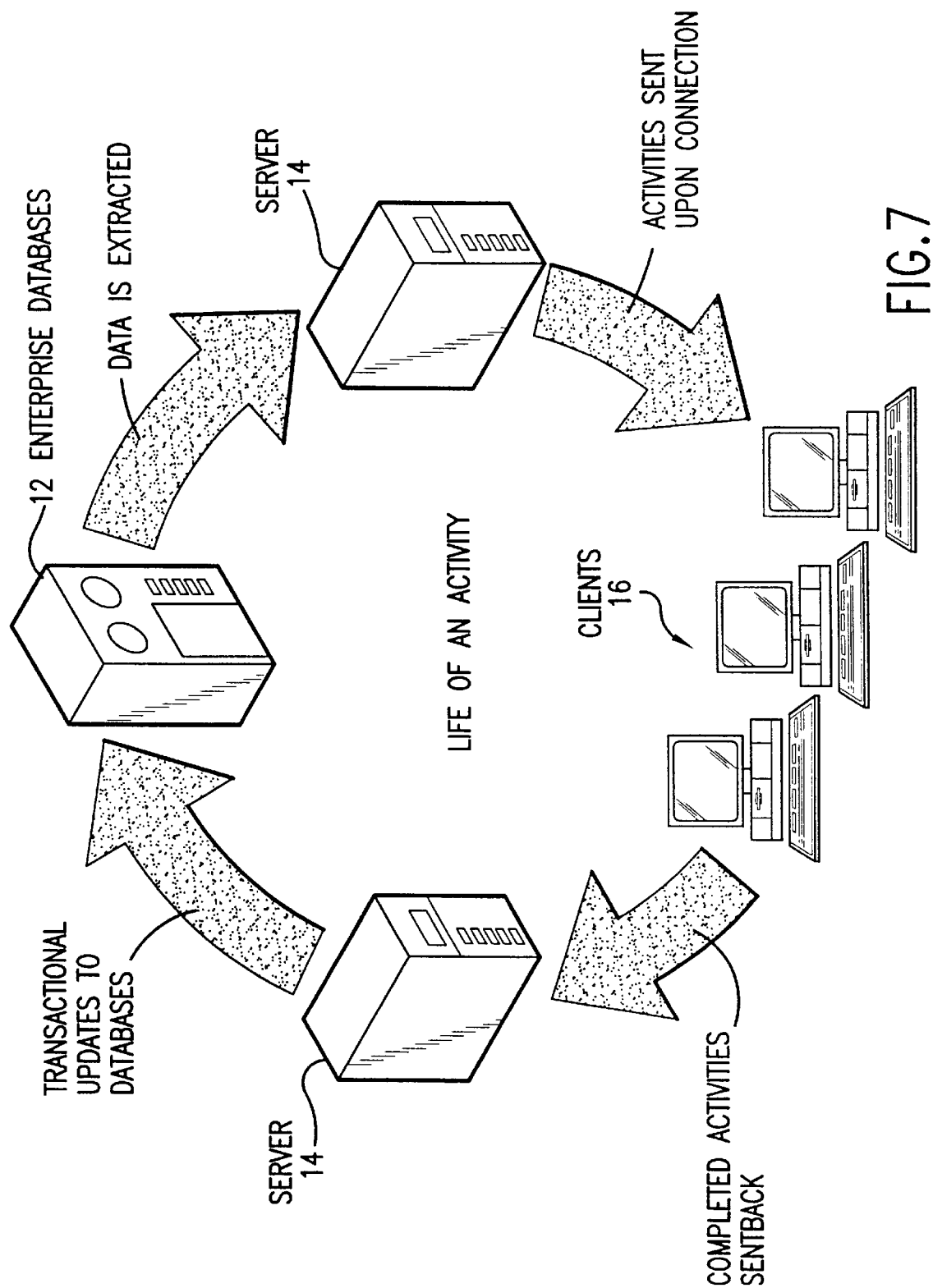
FIG. 7 is a diagrammatic view of the typical life cycle of an activity.

Referring to FIG. 7, a life cycle of an activity of the present invention is depicted. The data relevant to an activity is extracted from Enterprise database 12 by server 14. As described above, this typically a data subset specific to the activity. Upon a connection between client 16 and server 14, the activity tasks are completed by the client, the activity is sent bach to server 14 at the next or subsequent connection. The data, if modified or updated is then placed into the enterprise database.

Figure 8:
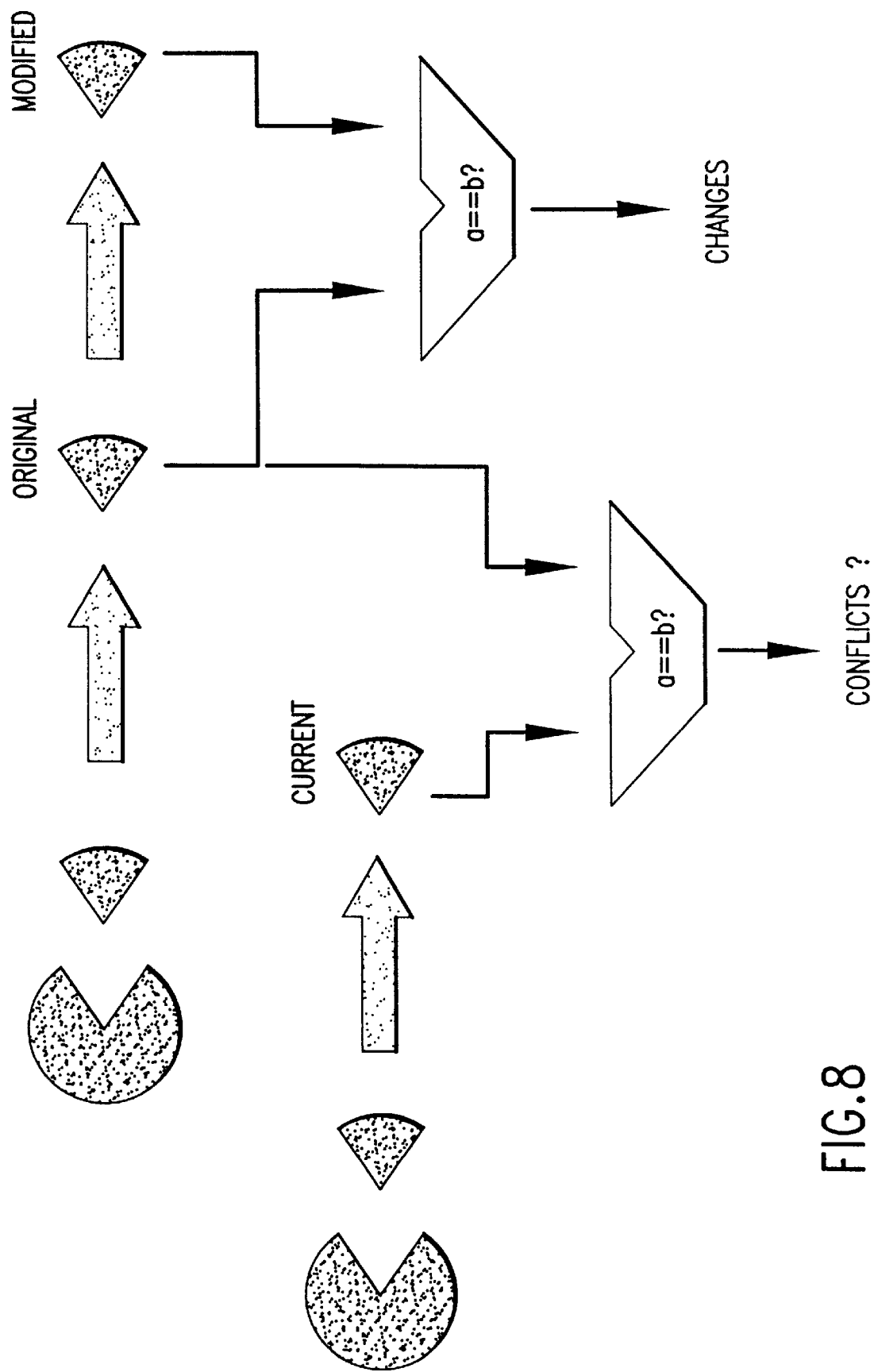
FIG. 8 is a diagrammatic view of conflict resolution of data.

Preferably, the transaction data coming back to the enterprise database is composed for conflicts, see for example FIG. 8, which depicts a preferred method for examining whether there is a change to be made or that a conflict exists with data that may have arrived with the activity from another remote client 16. The present invention does not establish a methology for resolving a conflict, but rather determines that a conflict exists by virtue of a change to the data subset intervening the departure and arrival of the activity in question. It is up to the user to establish conflict resolution.

While presently preferred embodiments of the invention have been shown and described in particularity, the invention may be otherwise embodied within the scope of the appended claims.

What is claimed is:

1. A client-server connectivity software system for transactional processing between enterprise databases and remote access users comprising:

A. server software comprising:
 i. at least one activity trigger for initiating a transaction;
 ii. a trigger manager for evaluating an activity trigger;
 iii. an activity scheduler for scheduling and managing a transaction activated by said trigger manager;
 iv. a predefined set of activities selected by said activity scheduler and in remote communication with a client administrator;
 v. a first script engine for translating preselected activities;
 vi. a system register for managing a users view of activities for controlling access to at least one enterprise database; and
 vii. a security manager for allowing communication between said system register and client administrator;

B. client software for at least one remote access connection comprising:
 i. a client manager for communication with said system register, security manager and predefined activities;
 ii. a communication manager for receiving and transmitting transactions from and to a mailbox to said system register;
 iii. a client system register in communication with said client manager;
 iv. a client security manager in communication with said client manager and said client system register;
 v. a database manager for accessing client or third party databases in selective communication with said system register; and
 vi. a second script engine for creating client transactions data for transmission to said system register.

2. A software system as claimed in claim 1 wherein said client software includes a forms engine for data input to said second script engine.

3. A software system as set forth in claims 1 or 2 wherein said server software includes a database manager for controlling transactional data between said system register and an enterprise database.

4. A software system as set forth in claim 1 or 2 wherein said client software includes an agent frame web for communicating a business application to said communication manager.

5. A software system as set forth in claim 1 wherein said activities include means for extracting a subset of data from said enterprise database.

6. A software system as set forth in claim 1 wherein said activities include means for restarting after a scheduled or unscheduled termination of a transaction.

7. A software system as set forth in claim 1 including means for detecting a conflict in data transmitted from a client to an enterprise database.

8. A software system as set forth in claim 1 or 7 knowing no means for resolving any conflicts detected in the transmission of data.

9. A software platform for developing long-lived transactions between occasionally connected client and server computers comprising:

A. a system resident upon said client and said server for managing communication between said client and server; said system including a script for writing object programs executable on said client and server;

B. at least one activity object having an object code executable in part on said client and said server; said activity having at least one of a prologue, extraction, task assignment, task, data update and epilogue.

C. means for scripting an activity and for defining data subsetting of a database for extraction and updating by said activity.

10. A platform as set forth in claim 9 wherein said activity includes means for recovering from a failure.

11. A platform as set forth in claim 10 wherein said activity includes means for restarting an activity which is terminated and for undoing a transaction including rolling back more than one activity.

12. A platform as set forth in claim 9 wherein said script includes a plurality of objects.

13. A platform as set forth in claim 9 wherein said system includes means for data subsetting of specific domains for data manipulation.

14. A platform as set forth in claim 13 wherein said data subsetting includes scheme subsetting and record subsetting.

* * * * *